United States Patent
Bartlow et al.

(10) Patent No.: US 9,924,148 B2
(45) Date of Patent: Mar. 20, 2018

(54) HIGHLIGHT PROGRAM

(71) Applicant: ECHOSTAR TECHNOLOGIES L.L.C., Englewood, CO (US)

(72) Inventors: Joseph Bartlow, Denver, CO (US); Neil Marten, Denver, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 325 days.

(21) Appl. No.: 14/179,953

(22) Filed: Feb. 13, 2014

(65) Prior Publication Data

US 2015/0228309 A1    Aug. 13, 2015

(51) Int. Cl.

| | |
|---|---|
| *H04N 9/87* | (2006.01) |
| *G11B 27/031* | (2006.01) |
| *H04N 21/44* | (2011.01) |
| *A63F 13/00* | (2014.01) |
| *A63F 13/497* | (2014.01) |
| *A63F 13/338* | (2014.01) |
| *H04N 5/91* | (2006.01) |
| *A63F 13/79* | (2014.01) |

(52) U.S. Cl.
CPC ............... *H04N 9/87* (2013.01); *A63F 13/00* (2013.01); *A63F 13/338* (2014.09); *A63F 13/497* (2014.09); *G11B 27/031* (2013.01); *H04N 5/91* (2013.01); *A63F 13/79* (2014.09); *H04N 21/44008* (2013.01)

(58) Field of Classification Search
CPC ...... A63F 13/00; A63F 13/338; A63F 13/497; A63F 13/79; G11B 27/031; H04N 5/91; H04N 9/87; H04N 21/44008

USPC .............................. 386/241, 278; 463/31, 42
See application file for complete search history.

(56) References Cited

U.S. PATENT DOCUMENTS

| | | | | |
|---|---|---|---|---|
| 6,973,256 | B1* | 12/2005 | Dagtas | G06F 17/30787 386/241 |
| 7,584,428 | B2* | 9/2009 | Yeh | G11B 27/28 715/723 |
| 8,702,504 | B1* | 4/2014 | Hughes | G06F 3/04842 463/29 |
| 2004/0167767 | A1* | 8/2004 | Xiong | G10L 25/00 704/1 |
| 2007/0041706 | A1* | 2/2007 | Gunatilake | G11B 27/10 386/241 |
| 2007/0113250 | A1* | 5/2007 | Logan | H04N 7/17318 725/46 |
| 2009/0082110 | A1* | 3/2009 | Relyea | G07F 17/32 463/42 |
| 2011/0256911 | A1* | 10/2011 | Heller | A63F 9/24 463/2 |
| 2015/0082349 | A1* | 3/2015 | Ishtiaq | H04N 21/23418 725/40 |

(Continued)

*Primary Examiner* — Gelek W Topgyal
(74) *Attorney, Agent, or Firm* — Lorenz & Kopf, LLP

(57) ABSTRACT

An electronic device and a method for generating a highlight program are provided. The electronic device, for example, includes, but is not limited to a communication device, and a processor communicatively coupled to the communication device, wherein the processor is configured to receive extraction settings, receive game data from the communication device, set an extraction point in the game data based upon the extraction settings, and create a highlight program including media from the game data based upon the extraction point.

18 Claims, 2 Drawing Sheets

(56) References Cited

U.S. PATENT DOCUMENTS

Figure 1:
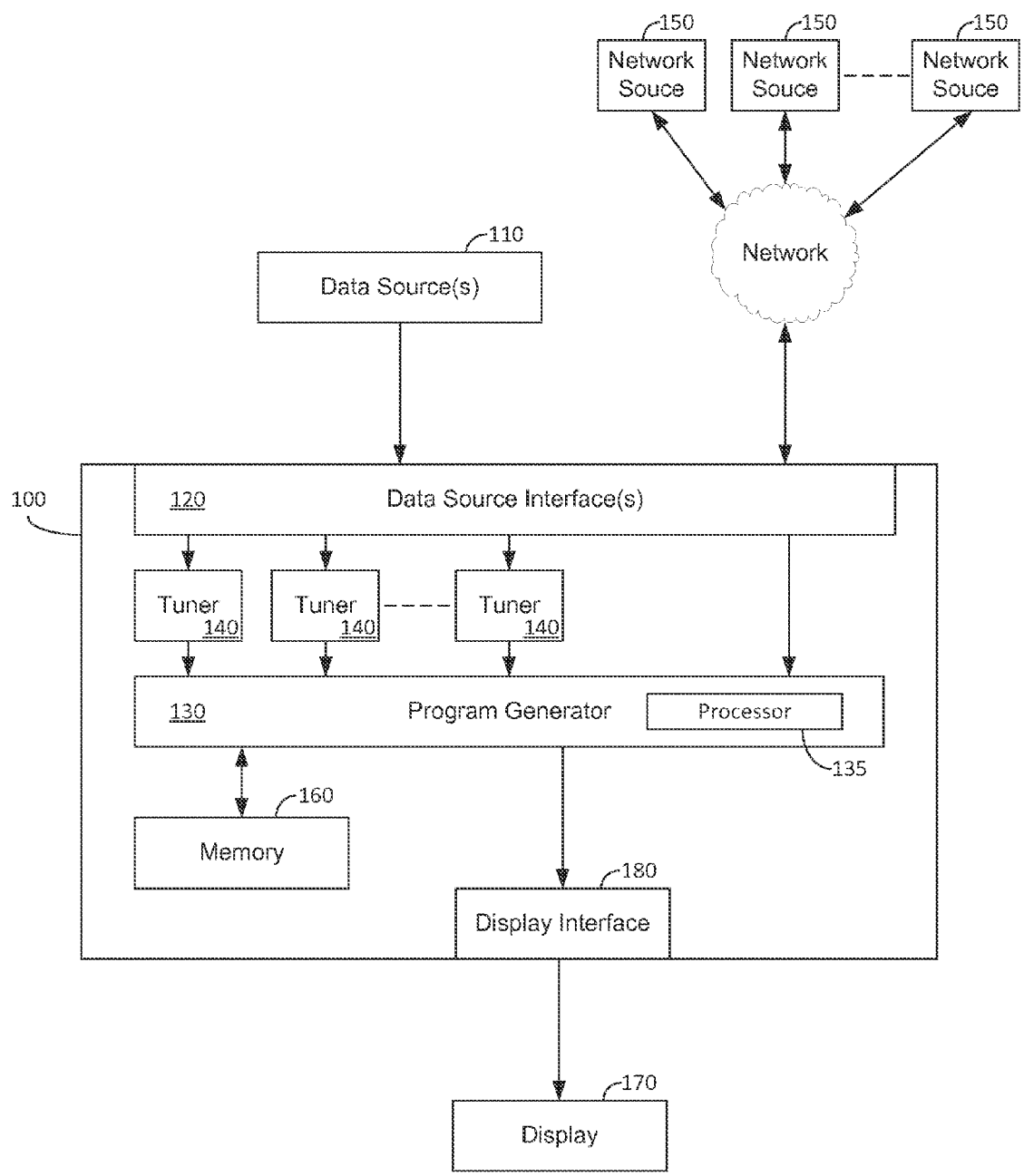

2015/0358690 A1* 12/2015 Thompson ....... H04N 21/25891
725/32
2015/0375117 A1* 12/2015 Thompson .............. A63F 13/35
463/9

* cited by examiner

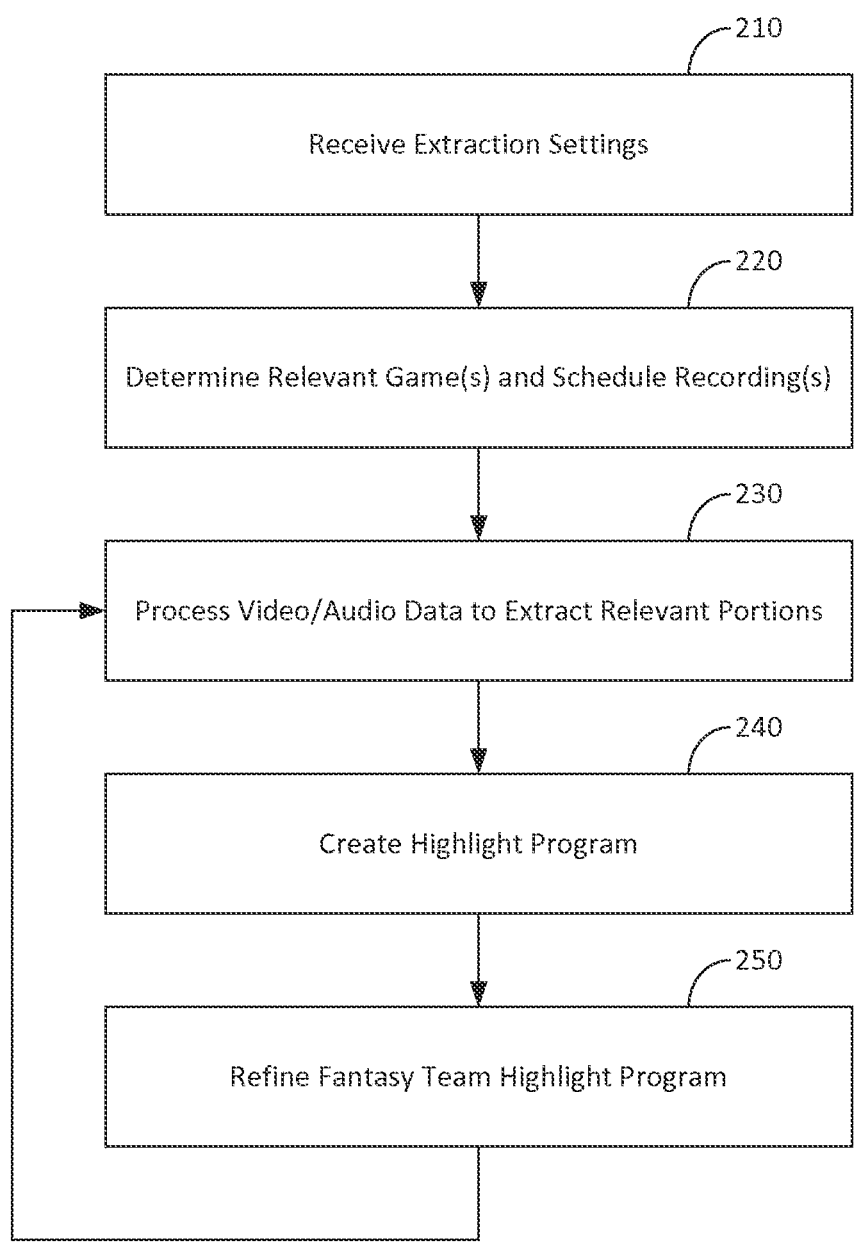

HIGHLIGHT PROGRAM

TECHNICAL FIELD

The following relates to systems and methods for creating and presenting a highlight program.

BACKGROUND

Following a sport can be time consuming. Major League Baseball, for example, plays around ninety games per week during the season. The National Football League plays generally around 16 games per week. For the average sports fan, or even the avid sports fan, watching every game is nearly impossible. Many people also play fantasy games, where they draft a team of players and compete with friends or online. Some fantasy teams may have over twenty players. Watching each game where one of the fantasy team players is playing is also incredibly time consuming.

SUMMARY

In accordance with one embodiment, an electronic device is provided. The electronic device may include, but is not limited to, a communication device, and a processor communicatively coupled to the communication device, wherein the processor is configured to receive extraction settings, receive game data from the communication device, set an extraction point in the game data based upon the extraction settings, and create a highlight program including media from the game data based upon the extraction point.

In accordance with another embodiment, a method for creating a highlight program is provided. The method may include, but is not limited to, receiving, by a processor, extraction settings, receiving, by the processor, game data from a communication device, setting, by the processor, an extraction point in the game data based upon the extraction settings, and creating, by the processor, the highlight program including media from the game data based upon the extraction point.

In accordance with another embodiment, a set-top box is provided. The set-top box may include, but is not limited to a memory, a communication device, and a processor communicatively coupled to the memory and the communication device, wherein the processor is configured to receive extraction settings, receive game data from the communication device, set an extraction point in the game data based upon the extraction settings, create a highlight program including media from the game data based upon the extraction point, and save the highlight program to memory.

DESCRIPTION OF THE DRAWING FIGURES

Exemplary embodiments will hereinafter be described in conjunction with the following drawing figures, wherein like numerals denote like elements.

FIG. 1 is a block diagram of an entertainment system in accordance with an embodiment; and FIG. 2 is a flow chart illustrating an exemplary method for generating a fantasy team highlight program, in accordance with an embodiment.

DETAILED DESCRIPTION

According to various exemplary embodiments, a system and method for creating a highlight program is provided. The highlight program is automatically extracted from one or more full games and presents a viewer with a summary of the plays the user is interested in viewing. As discussed in further detail below, the highlight program may be for a fantasy team where the highlight program shows plays where one of the viewer's players scored points for the fantasy team.

FIG. 1 is a block diagram of an entertainment system 100 in accordance with an embodiment. The entertainment system 100 may be, for example, a set-top box, a television, a personal computer, a laptop computer, a tablet, a cell phone or any other electronic device or combination thereof. The entertainment system 100 receives data from one or more data sources 110 at one or more data source interfaces 120. The data source(s) 110, for example, may be a satellite television source, a cable television source, an over-the-air television source, an internet protocol television (IPTV) source, a network streaming television source, or any other audio or video source or any combination thereof. The data source interface(s) 120 will depend upon the data source(s) 110 and may include, but is not limited to, a high definition multimedia interface (HDMI), a coaxial interface, a wired-network interface, a wireless-network interface (WI-FI, Bluetooth, Zigbee, etc.), a cellular network interface, or any other data interface or combination thereof.

The entertainment system 100 further includes a program generator 130. The program generator 130, as discussed in further detail below, is capable of generating a fantasy team highlight program. The program generator 130 includes at least one processor 135. The processor 135 may be a central processing unit (CPU), a graphics processing unit (GPU), a physics processing unit (PPU), an application specific integrated circuit (ASIC), a field programmable logic array (FPGA), a microprocessor, or any other logic device or combination thereof. The processor 135 may be dedicated to the program generator 130 (as illustrated in FIG. 1) or may be a shared processing unit with other elements within the entertainment system 100.

The program generator 130 receives game date (i.e., video data and/or audio data) from the data interface(s) 120. In one embodiment, for example, when a data source 110 is a broadcast television source, such as a satellite or cable television signal, the program generator 130 may receive the video and audio data through one or more tuners 140. Each tuner 140 converts a radio frequency analog television or digital television transmission into audio and video signals which can be further processed to produce the sound and picture for the fantasy team highlight program. When multiple games are being played at the same time, for example, multiple tuners may be needed to extract the video and audio from the data source(s) 110. The program generator 130 may also receive data from one or more network sources 150 when creating the fantasy team highlight program. As discussed in further detail below, the data from the network sources 150 may be used to select the relevant portions of entire games received from the data source(s) 110. The game data as well as the highlight program may be saved in a memory 160. The memory 160 may be any combination of volatile and non-volatile memory. The memory 160 may also store non-transitory computer-readable instructions for generating a fantasy team highlight program, as discussed in further detail below. The highlight program may then be output to a display 170 coupled to or part of the electronic device 100 through a display interface 180.

FIG. 2 is a flow chart illustrating an exemplary method 200 for generating a fantasy team highlight program, in accordance with an embodiment. A processor, such as the processor 135 illustrated in FIG. 1, first receives extraction settings for the fantasy team highlight program. (Step 210). The extraction settings may include, for example, team data including the players, parts of teams (e.g., defense or special teams in football), or entire teams that a user wishes to include in the fantasy team highlight program. In one embodiment, for example, a user may manually enter the team data into the entertainment system 100 via an input device such as a remote control, a touch screen, a mouse, a keyboard or any combination thereof. In another embodiment, for example, the processor may receive the team data from a network source. A user, for example may input credentials (i.e., a username and password) for a fantasy team website, such as those organized by ESPN, Yahoo!, NFL.com or any other fantasy site. The processor may then extract team data from the website. In one embodiment, for example, the processor may monitor the user's fantasy team on the network source to determine if any changes to the starting lineup or to the user's roster of players were made. If changes have been made, the processor may update the team data on the entertainment system 100.

In one embodiment, for example, the extraction settings may also determine which portions of the game(s) are added to the fantasy team highlight program. The user, for example, may have the option to set what types of plays are added to the program. For example, the extraction settings may indicate to add only scoring plays, big plays (e.g., plays over a certain yardage, interceptions, doubles or greater, ally oops, fights, game winning plays, etc.), or any play the player is involved in. The extraction settings may also set whether or not replays of an extracted play should be included in the highlight program. The extraction settings may also allow a choice to extract plays of non-active players on their team so that a user may compare their benched players with their active team. In one embodiment, for example, the user can set the extraction points based upon when the user's fantasy team gained and/or lost points. The user could also set a sensitivity level. For example, the extraction point may only be set is greater than a set number of fantasy points where gained on a given play.

The processor then determines the relevant game(s) and schedules the recording(s). (Step 220). The determination, for example, may be based upon data from an electronic programming guide or from data from one of the network sources 150. If there are scheduling conflicts, or the number of recordable games is limited based upon a number of tuners in the electronic device 100, the processor may attempt to schedule replays of one or more games to be recorded or look for an alternate source for the game data. In one embodiment, for example, the extraction settings may indicate a priority level for one or more players, teams or games. Accordingly, the processor, if not all of the games can be recorded, may record the games based upon the priority levels.

The processor, as the data streams from the games becomes available, saves the game data in the memory 160 and begins processing the data to extract the relevant portions of the games according to the received team data and settings. (Step 230). In one embodiment, for example, the processor may use a variety of ways or combination of ways to determine extraction points, or in other words, which segments of the game data are relevant. The processor, for example, may set extraction points by using video processing techniques to determine when a player's face or jersey number appear in the video or when graphics (e.g., statistic summaries or other visual information regarding one of the players) appear in the video related to the player. In one embodiment, for example, an extraction point for a play may be set if the processor determines, via video processing techniques, that a play a selected player was involved in was replayed on the original footage, which could possibly indicate a big play. The processor may also set extraction points by using audio processing techniques to determine when a player is mentioned by commentators on the game. Alternatively, or in addition thereto, the processor could also set extraction points by processing the closed captioning provided with the broadcast to determine when a player is mentioned. In one embodiment, for example, the processor may set extraction points if certain key words or phrases are mentioned with respect to a player or team via the audio processing and/or the closed captioning. The key words may vary depending upon the sport, but may include, but are not limited to, terms such as shoots, scores, two-pointer, 3-pointer, single, double, triple, home run, grand slam, steals second, strikeout, walk, touchdown, field goal, goal, big catch, great catch, huge play, great save, play of the game, critical down, long run, breaks a tackle, alley oop, dunk, posterize, block, one-timer, penalty shot, or any combination or variation thereof. In one embodiment, for example, the processor may also analyze the audio data in the game data for background crowd noise at the game. When the crowd noise exceeds a threshold, possibly indicating a big play in the game, the processor may set an extraction point.

The processor may also utilize data from one or more of the network sources to set extraction points. In one embodiment, for example, a network source such as ESPN, Yahoo, or STATS LLC, may include game log data. The game log data will vary by sport. If the highlight program is for football, for example, the game log may track a type of play (pass, run, field goal, kickoff return, etc.), the player(s) involved (e.g., quarter back and receiver for a pass play, or the running back on a run play), and the result of the play (e.g., yards gained or lost, if the play resulted in a score, first down, turnover etc.). The game log data may also include a timestamp for the respective play. Accordingly, the processor, based upon the game log data, may determine which segment of the game data to extract. The processor may correlate the game log or timestamp data with the live game footage in a variety of ways. In one embodiment, for example, the processor may use video processing techniques to track a game clock displayed on the live footage and correlate a timestamp for a play thereto. In other embodiments, for example, a combination of the game's total TV air time and the games period/section may be used as a tracker for sports without timers. In baseball, for example, the system would track the innings in combination with the recordings time stamps and may possibly include a the number of outs and/or the number of runners on base.

In one embodiment, for example, the processor may extract a portion of the game data a predetermined amount of time starting before the extraction point and a predetermined amount of time after the extraction point. By extracting game data before and after the extracting point, the user may be able to see the set up to the highlight as well as the aftermath. The processor may also use video processing techniques to determine when to start and stop the highlight. For example, if the highlight program is for football, the processor may process the video data to attempt to determine when the play begins by determining when the players lined up at scrimmage. If the highlight program is for basketball hockey or soccer, the processor may analyze the video data to determine when a camera direction changes and/or a flow of players switches from one side of the field of play to the other. The processor may also use a combination of techniques to extract the game data. For example, the processor may initially extract a predetermined amount of game footage around the extraction point so that a user can watch the highlight program in substantially real time (i.e., as the games are still being played). Then, while the games are still ongoing and/or after the games are complete, the processor may further refine the highlight program using the video processing technique discussed above.

The processor then creates the fantasy team highlight program by saving the extracted game data to the highlight program. (Step 240). The highlight program may be organized in a variety of ways. In one embodiment, for example, the highlight program may intermix footage from a number games. In other words, the highlight program may add the game footage to the highlight program in the real time order in which the highlight occurred. This organization may be desired by a user who wishes to watch the highlight program in substantially real time rather than flipping back and forth between a number of live games. In another embodiment, for example, the highlight program may be segmented based upon the players. In other words, each player's highlights would be shown together rather than intermixed with other player's highlights. This organization scheme may be preferred by a user watching the highlight program not in real time (i.e., when the games on not currently ongoing). Further, a combination of the techniques may be used. For example, while the games are ongoing, the processor may organize the footage based upon when the play occurred in real time. Then, after the games are complete for the day or week, the processor may reorganize the footage for each individual player, or organize the footage by displaying the biggest plays first, or any combination of the techniques discussed herein.

Further, a number of presentation techniques may be used. In one embodiment, for example, the processor may add text to the footage to set up the highlight. If the footage is for football, for example, the processor may add "Player X: $3^{rd}$ and 4, Ball at Team X 30 Yard line, 0:30 Seconds left, $4^{th}$ Quarter" to the footage. In one embodiment, for example, the system may use commentator audio to help introduce scenes. The commentator audio could be pulled from the game footage or from half time or post game recaps if available.

As discussed above, the processor may further refine the highlight program after the program is created or while the program is still being created. (Step 250). In one embodiment, for example, the processor may refine the highlight program as more data sources become available or as data sources change information. Some network sources may not have game log data until after the game is over, or may make corrections to a substantially live game log after the game is over. The processor may monitor the networks sources and update the highlight program as the sources become available or are updated.

In one embodiment, for example, the processor may also add an extraction point tag to the game data for a full game saved in the memory. In one embodiment, for example, a tag may be added to a time shift buffer. Accordingly, a user who wishes to view the entire saved game can forward to the highlight plays as desired. Further, while the highlight program was discussed with respect to fantasy teams, the processor could also create a custom highlights for an entire game. In other words, the processor could use the extraction techniques herein to automatically create a compressed version of a game including all of the games big plays.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An electronic device, comprising:
a communication device; and
a processor communicatively coupled to the communication device, wherein the processor is configured to:
receive extraction settings for one or more players of a fantasy sports team;
receive audio and video game data in real time while one or more games including one or more players of the fantasy sports team is on-going from the communication device;
set, in real time while one or more games including one or more players of the fantasy sports team is on-going, a plurality of extraction points in the audio and video game data based upon the extraction settings, each of the plurality of extraction points corresponding to an estimated time of a beginning or an estimated time of an end of a play involving the one or more players of the fantasy sports team;
create, in real time while one or more games including one or more players of the fantasy sports team is on-going, a fantasy sports team highlight program including media from the audio and video game data based upon the plurality of extraction points; and
refine, in real time while one or more games including one or more players of the fantasy sports team is on-going and after the one or more games including one or more players of the fantasy sports team is finished, the estimated time of the beginning of a respective play and the estimated time of the end of the respective play for each play in the created fantasy sports highlight program when new game data for the respective play other than the audio and video game data is received from the communication device, the refined fantasy sports highlight program altering a time of at least one of the a plurality of extraction points in the audio and video game data to more accurately reflect an actual beginning of the respective play and an actual end of the respective play.

2. The electronic device of claim 1, wherein the processor is further configured to set at least one of the plurality of extraction points based upon video processing the game data based upon the received extraction settings.

3. The electronic device of claim 1, wherein the processor is further configured to set at least one of the plurality of extraction points based upon audio processing the game data based upon the received extraction settings.

4. The electronic device of claim 1, wherein the processor is further configured to set at least one of the plurality of extraction points based upon processing closed captioning data in the game data based upon the received extraction settings.

5. The electronic device of claim 1, wherein the processor is further configured to receive, from the communication device, game log data, and the processor is further configured to set at least one of the plurality of extraction points based upon the game log data.

6. The electronic device of claim 5, wherein the processor is further configured to set at least one of the plurality of extraction points by correlating a time in the game data with a time stamp in the game log data.

7. The electronic device of claim 1, wherein the processor is further configured extract game data a predetermined amount of time before each of the plurality of extraction points through a predetermined amount of time after each of the plurality of extraction points.

8. The electronic device of claim 1, wherein the processor is further configured to determine a beginning of a play associated with each of the plurality of extraction points based upon processing video data around the corresponding extraction point.

9. A method for creating a fantasy sports team highlight program, comprising:
receiving, by a processor, extraction settings for one or more players of a fantasy sports team;
receiving, by the processor, audio and video game data from a communication device in real time while one or more games including one or more players of the fantasy sports team is on-going, the game data corresponding to the one or more players of the fantasy sports team;
setting, in real time while the one or more games including the one or more players of the fantasy sports team is on-going by the processor, a plurality of extraction points in the audio and video game data based upon the extraction settings, each of the plurality of extraction points corresponding to an estimated time of a beginning or an estimated time of an end of a play involving the one or more players of the fantasy sports team;
creating, in real time while the one or more games including the one or more players of the fantasy sports team is on-going by the processor, the fantasy sports team highlight program including media from the audio and video game data based upon the plurality of extraction points; and
refining, by the processor in real time while one or more games including one or more players of the fantasy sports team is on-going and after the one or more games including one or more players of the fantasy sports team is finished, the estimated time of the beginning of a respective play and the estimated time of the end of the respective play for each play in the created fantasy sports highlight program when new game data other than the audio and video game data is received from the communication device, the refined fantasy sports highlight program altering a time of at least one of the a plurality of extraction points in the audio and video game data to more accurately reflect an actual beginning of the respective play and an actual end of the respective play.

10. The method according to claim 9, wherein the setting further comprises setting at least one of the plurality of extraction points based upon video processing the game data based upon the received extraction settings.

11. The method according to claim 9, wherein the setting further comprises setting at least one of the plurality of extraction points based upon audio processing the game data based upon the received extraction settings.

12. The method according to claim 9, wherein the setting further comprises setting at least one of the plurality of extraction points based upon processing closed captioning data in the game data based upon the received extraction settings.

13. The method according to claim 9, further comprising:
receiving, by the processor, game log data,
wherein the setting further comprises setting at least one of the plurality of extraction points based upon the game log data.

14. The method according to claim 13, wherein the setting further comprising setting at least one of the plurality of extraction points by correlating a time in the game data with a time stamp in the game log data.

15. The method according to claim 9, wherein the creating further comprises extracting, by the processor, game data a predetermined amount of time before the extraction point through a predetermined amount of time after the corresponding extraction point.

16. The method according to claim 9, wherein the creating further comprises determining, by the processor, a beginning of a play associated with the corresponding extraction point based upon processing video data around the corresponding extraction point.

17. A set-top box, comprising:
a memory;
a communication device; and
a processor communicatively coupled to the memory and the communication device, wherein the processor is configured to:
receive extraction settings for one or more players of a fantasy sports team;
receive audio and video game data from the communication device in real time while one or more games including one or more players of the fantasy sports team is on-going, the game data corresponding to the one or more players of the fantasy sports team;
set, in real time while the one or more games including the one or more players of the fantasy sports team is on-going, a plurality of extraction points in the audio and video game data based upon the extraction settings, each of the plurality of extraction points corresponding to an estimated time of a beginning or an estimated time of an end of a play involving the one or more players of the fantasy sports team;
create, in real time while the one or more games including the one or more players of the fantasy sports team is on-going, a fantasy sports team highlight program including media from the audio and video game data based upon the plurality of extraction points;
save the highlight program to the memory; and
refine, in real time while one or more games including one or more players of the fantasy sports team is on-going and after the one or more games including one or more players of the fantasy sports team is finished, the estimated time of the beginning of a respective play and the estimated time of the end of a respective play for each play in the created fantasy sports highlight program when new game data other than the audio and video game data is received from the communication device, the refined fantasy sports highlight program altering a time of at least one of the a plurality of extraction points in the audio and video game data to more accurately reflect an actual beginning of the respective play and an actual end of the respective play.

18. The set-top box according to claim 17, wherein the highlight program is a fantasy football team highlight program.

\* \* \* \* \*